United States Patent
Schlosser et al.

(10) Patent No.: US 6,557,875 B2
(45) Date of Patent: May 6, 2003

(54) VEHICLE SUSPENSION

(75) Inventors: Kraig Schlosser, Columbia City, IN (US); Martin Blessing, Fort Wayne, IN (US); Kent Davison, Columbia City, IN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/814,147

(22) Filed: Mar. 21, 2001

(65) Prior Publication Data

US 2002/0135151 A1 Sep. 26, 2002

(51) Int. Cl.⁷ .............................. B60G 7/00; B60G 3/12; B60B 37/00; B60B 35/00; B62G 3/18
(52) U.S. Cl. ............................. 280/124.153; 301/127; 280/124.128
(58) Field of Search .................. 280/124.128, 124.153; 301/127, 137

(56) References Cited

U.S. PATENT DOCUMENTS

| | | | | |
|---|---|---|---|---|
| 4,293,145 A | * | 10/1981 | Taylor | 267/34 |
| 4,415,179 A | * | 11/1983 | Marinelli | 280/124.116 |
| 4,991,868 A | * | 2/1991 | VanDenberg | 280/124.116 |
| 5,002,305 A | * | 3/1991 | Raidel | 280/124.116 |
| 5,037,126 A | * | 8/1991 | Gottschalk et al. | 280/124.116 |
| 5,203,585 A | * | 4/1993 | Pierce | 280/124.116 |
| 5,366,237 A | | 11/1994 | Dilling et al. | 280/711 |
| 5,375,871 A | * | 12/1994 | Mitchell et al. | 280/124.116 |
| 5,403,031 A | * | 4/1995 | Gottschalk et al. | 280/124.157 |
| 5,443,280 A | * | 8/1995 | Kawaguchi et al. | 280/124.1 |
| 5,690,353 A | * | 11/1997 | Vandenberg | 280/124.116 |
| 5,944,339 A | | 8/1999 | McKenzie et al. | 280/678 |
| 5,954,351 A | | 9/1999 | Koschinat | 280/124.116 |
| 5,988,672 A | * | 11/1999 | VanDenberg | 280/124.11 |
| 6,039,336 A | * | 3/2000 | Frey | 280/124.128 |
| 6,062,578 A | * | 5/2000 | Richardson | 280/81.6 |
| 6,073,946 A | * | 6/2000 | Richardson | 280/124.153 |
| 6,123,349 A | * | 9/2000 | Depue | 280/124.106 |
| 6,241,266 B1 | * | 6/2001 | Smith et al. | 280/124.116 |

FOREIGN PATENT DOCUMENTS

| | | | | | |
|---|---|---|---|---|---|
| JP | 09254623 A | * | 9/1997 | | B60B/13/08 |
| WO | WO9817487 A | * | 6/1998 | | B60G/9/00 |
| WO | WO00/01548 A | * | 1/2000 | | B60G/9/00 |

\* cited by examiner

*Primary Examiner*—Paul N. Dickson
*Assistant Examiner*—Joselynn Y. Sliteris
(74) *Attorney, Agent, or Firm*—Dykema Gossett PLLC

(57) ABSTRACT

A vehicle suspension and a control arm therefor are provided. The control arm includes first and second members each defining a recess corresponding to a portion of the outer surface of a vehicle axle. The members are welded or otherwise coupled together to surround at least a majority of the axle thereby enabling installation of the control arm without sliding the arm onto the axle. Each of the members includes a pair of sidewalls and a lateral wall joining, and integral with, the sidewalls. The sidewalls are angled relative to an axis of the axle to provide sufficient clearance for a spring assembly mounted to the control arm and centering of spring loads. The two sidewalls of one member may further include aligned apertures configured to receive a tube on which a shock absorber may be mounted. The tube enables strong and accurate mounting of the shock absorber.

20 Claims, 3 Drawing Sheets

VEHICLE SUSPENSION

BACKGROUND OF THE INVENTION

1. Field of the Invention

This invention relates to vehicle suspensions and, in particular, to structures for trailing and forward arms commonly found in such suspensions.

2. Disclosure of Related Art

In a conventional vehicle suspension system, a suspension control arm has a first end rigidly connected to an axle of the vehicle and a second end pivotally connected to a bracket descending from the vehicle frame. The control arm may be coupled to the axle using conventional mounting hardware such as a U-bolt and mounting bracket. Alternatively, the mounting hardware may be eliminated by fabricating a control arm having first and second sidewalls through which the axle passes. The control arm slides onto the axle and is then welded in place. The control arms found in conventional suspensions may also include mounting brackets disposed thereon for springs, shock absorbers, and other components of the suspension.

The suspension control arms found in conventional suspension systems have several disadvantages. In particular, the control arm is often located parallel to the longitudinal axis of the vehicle (and perpendicular to the axis of the vehicle axle) at an outboard position. The springs found in conventional suspension systems, however, require sufficient clearance from the vehicle wheels and brake assembly components. Accordingly, brackets mounted to the control arm to support the spring extend in an inboard direction from the control arm and the spring load is not centered on the control arm. In the case of the above-described fabricated control arm, one attempt to overcome this problem has been to angle one of the two sidewalls of the control arm in an inboard direction and lengthen a lateral wall joining the two sidewalls. This configuration, however, requires a relatively large amount of material for the lateral wall and adds significant weight to the vehicle. Conventional control arms also often do not provide sufficient structural support and positional accuracy for mounting shock absorbers. Control arms that are configured to slide onto the axle have several additional disadvantages. In particular, a weld coupling the two sidewalls to the axle must be interrupted at several points thereby resulting in a relatively weak joint at a location that is subject to a relatively high level of stress. Further, because the control arm must be slid onto the axle, installation of other components of the suspension, brake, and wheel assemblies cannot be accomplished prior to installation of the control arm.

There is thus a need for a vehicle suspension and a control arm therefor that will minimize or eliminate one or more of the above-mentioned deficiencies.

SUMMARY OF THE INVENTION

The present invention provides a vehicle suspension and a suspension control arm therefor.

In accordance with one aspect of the present invention, a suspension is provided that includes a control arm extending between an axle and a bracket of a vehicle frame. The control arm may include a first member having first and second spaced sidewalls. Each of the first and second sidewalls may be angled in an inboard direction relative to an axis of the axle whereby the first and second sidewalls are further inboard proximate the axle than the vehicle frame bracket. Because both sidewalls are angled in an inboard direction, springs loads can be centrally located on the arm without the material costs and increase in weight found in conventional systems.

In accordance with another aspect of the present invention, the suspension control arm may include a second member that is coupled to the first member. The first member may define a first recess at one end that corresponds to a first portion of an outer surface of the axle. The second member may define a second recess corresponding to a second portion of the outer surface of the axle. The second member is coupled to the first member after the axle is received within the first recess. In this manner, the control arm is capable of surrounding much, or even all, of the axle without the need to slide the control arm onto the axle. As a result, other suspension, wheel and brake assembly components can be installed prior to installation of the control arm. Each of the first and second members of the control arm may include a pair of spaced sidewalls and a lateral wall joining, and integral with, the two sidewalls. In accordance with another aspect of the present invention, the edges of the two sidewalls and the lateral wall abut the outer surface of the axle forming a continuous weld path for a weld that couples the control arm to the axle. As a result, the weld produces a relatively strong joint at a location that is subject to a relatively high level of stress. Finally, in accordance with another aspect of the present invention, the control arm may include a tube extending through the sidewalls and configured to receive a fastener. The eye of a shock absorber may be disposed about the fastener. The resulting configuration provides a stronger and more accurate mounting point for the shock absorber as compared to conventional control arms with welded mounting brackets.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
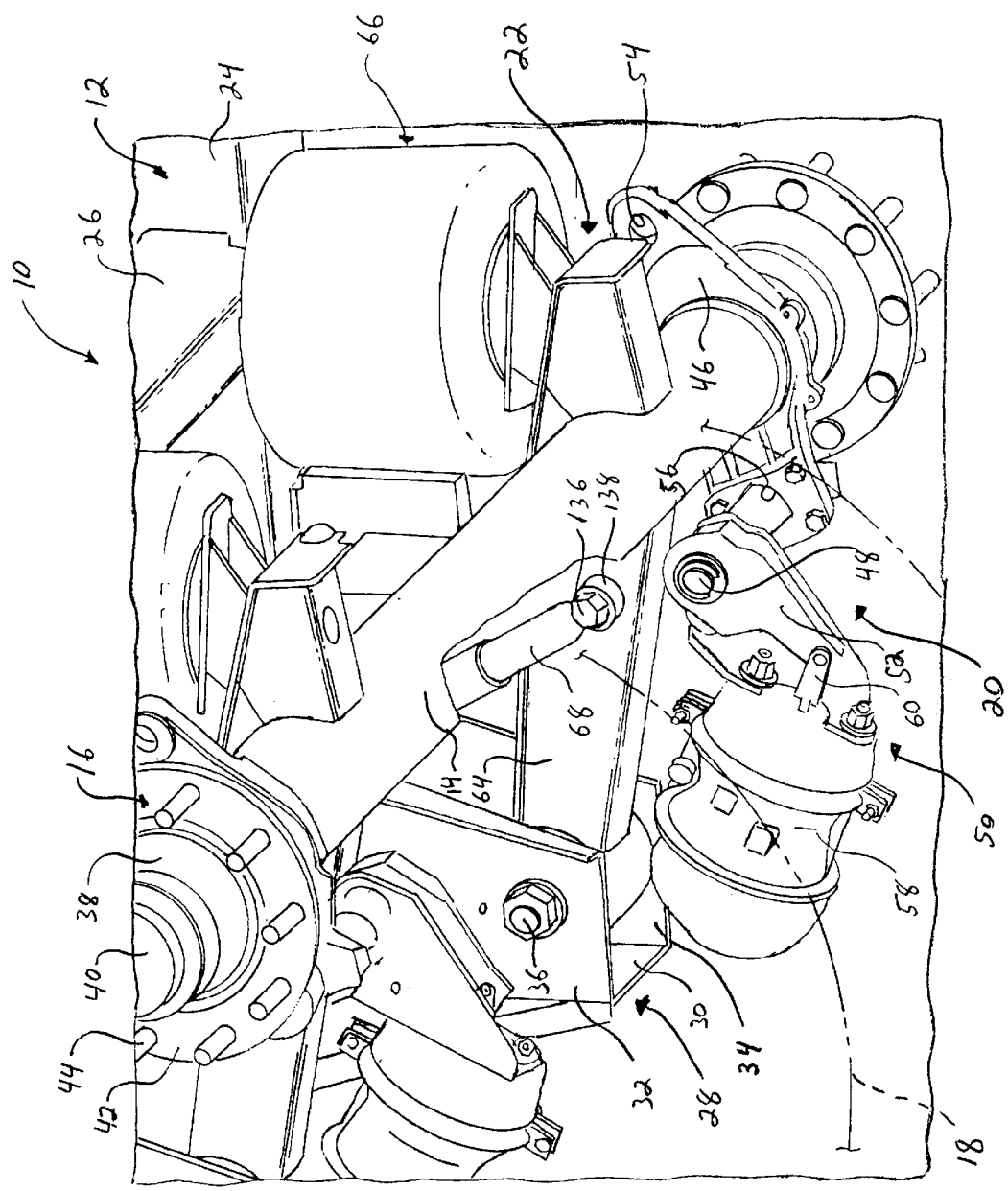
FIG. 1 is a perspective view of a portion of a vehicle incorporating a vehicle suspension in accordance with the present invention.

Referring now to the drawings wherein like reference numerals are used to identify identical components in the various views, FIG. 1 illustrates a portion of a vehicle 10. Vehicle 10 may include a frame 12, one or more axles 14, wheel hub assemblies 16, wheels 18 (shown in phantom), brake assemblies 20, and one or more suspensions 22 in accordance with the present invention. In the illustrated embodiment, vehicle 10 comprises a semi-trailer. It should be understood, however, that the present invention may find application in a wide variety of vehicles.

Frame 12 provides structural support to the body of vehicle 10. Frame 12 is conventional in the art and may be made from conventional metals and metal alloys such as steel. Frame 12 may include a pair of longitudinal rails 24 (only one of which is shown in FIG. 1) and cross-members 26 as is conventional in the art. Frame 12 may also include a plurality of mounting brackets, such as bracket 28, for mounting various components of vehicle 10 including suspension 22. Bracket 28 is provided to pivotally mount suspension 22 to frame 12 and is conventional in the art. Bracket 28 includes a center wall 30 and a pair of spaced sidewalls 32, 34 and may be welded to or integral with frame 12. Sidewalls 32, 34 include aligned, elongated slots (not shown) configured to receive a fastener 36 on which suspension 22 is pivotably mounted and through which suspension 22 may be aligned in a fore-aft direction.

Axle 14 is provided to support frame 12 on wheels 18 and also provides mounting surfaces for various suspension and brake components. Axle 14 is conventional in the art and may be made from conventional metals and metal alloys such as steel. Axle 14 extends in a transverse direction relative to vehicle 10 and may support one or more wheels 18 on each end. In the illustrated embodiment, axle 14 is tubular and is circular in cross-section. It should be understood, however, that the shape of axle 14 may vary in response to design parameters associated with other components of vehicle 10.

Wheel hub assemblies 16 are provided to rotatably support wheels 18 on either end of axle 14 and are conventional in the art. Each assembly 16 may include a wheel hub 38 supported for rotation on a spindle 40 extending from the end of axle 14 either through a drive shaft (not shown) passing through spindle 40 (in the case of a driven wheel) or through wheel bearings (not shown) supported on spindle 40 (in the case of a non-driven wheel). Wheel hub 38 may include a radially extending, circular flange 42 bearing a plurality of threaded studs 44 on which a wheel rim may be mounted.

Wheels 18 are provided to support vehicle 10 and are also conventional in the art. Wheels 18 are supported for rotation on each end of axle 14 through wheel hub assemblies 16 and include tires mounted thereon.

Brake assemblies 20 are provided for selective application of a braking torque to wheels 18. Brake assemblies 20 are conventional in the art. Each brake assembly 20 may include a brake spider 46, a cam shaft 48, a brake actuator assembly 50, and a brake adjuster 52.

Brake spider 46 provides a mounting point for a pair of brake shoes (not shown) used to apply a braking torque to wheels 18. Spider 46 is conventional in the art and may be made from conventional metals and metal alloys such as steel. Spider 46 is rigidly mounted to axle 14 and includes a pair of apertures 54, 56. Aperture 54 is configured to receive an anchor pin (not shown) on which one end of each brake shoe may be pivotally mounted. Aperture 56 is configured to receive cam shaft 48.

Cam shaft 48 is provided to enable selective rotation of an S-cam (not shown) fixed to an outboard end of shaft 48 to thereby cause the brake shoes to pivot about the anchor pin and engage wheels 18. Shaft 48 is conventional in the art. Shaft 48 extends from brake adjuster 52 through aperture 56 in spider 46 and the S-cam is mounted on the outboard side of spider 46.

Brake actuator assembly 50 is provided to cause selective rotation of cam shaft 48 in order to apply the brakes to wheels 18. Actuator assembly 50 is conventional in the art and may include an actuator 58 and an actuator pushrod 60. Actuator 58 moves actuator pushrod 60 in a substantially linear direction. This linear motion is then translated to rotational motion of cam shaft 48 through brake adjuster 52.

Brake adjuster 52 is provided to adjust the rotation of cam shaft 48 as the brake liners found on the brake shoes wear over time. Adjuster 52 is also conventional in the art.

Suspension 22 is provided to couple axle 14 to frame 12 and to allow for movement of axle 14 relative to frame 12. It should be understood that similar suspensions 22 may be disposed at each end of axle 14. In accordance with the present invention, suspension 22 may include a control arm 64. Suspension 22 may also include a spring assembly 66 and a conventional shock absorber 68.

Figure 2:
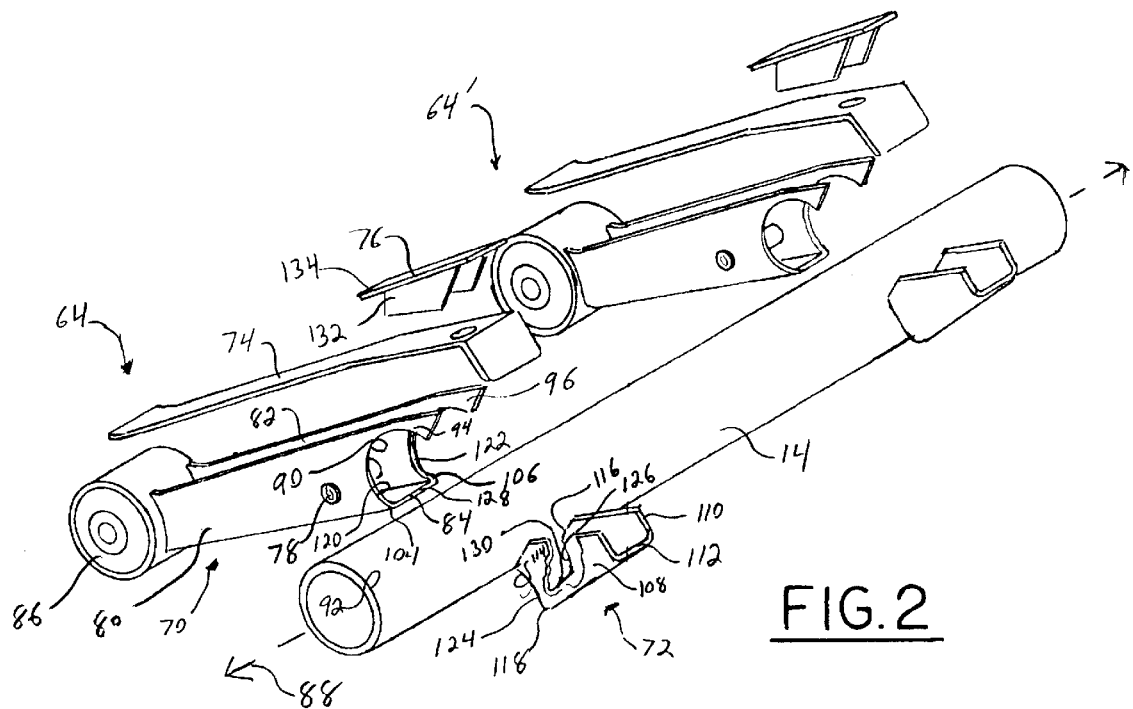
FIG. 2 is an exploded perspective view of control arms in accordance with the present invention for use in the suspension illustrated in FIG. 1.
Figure 3:
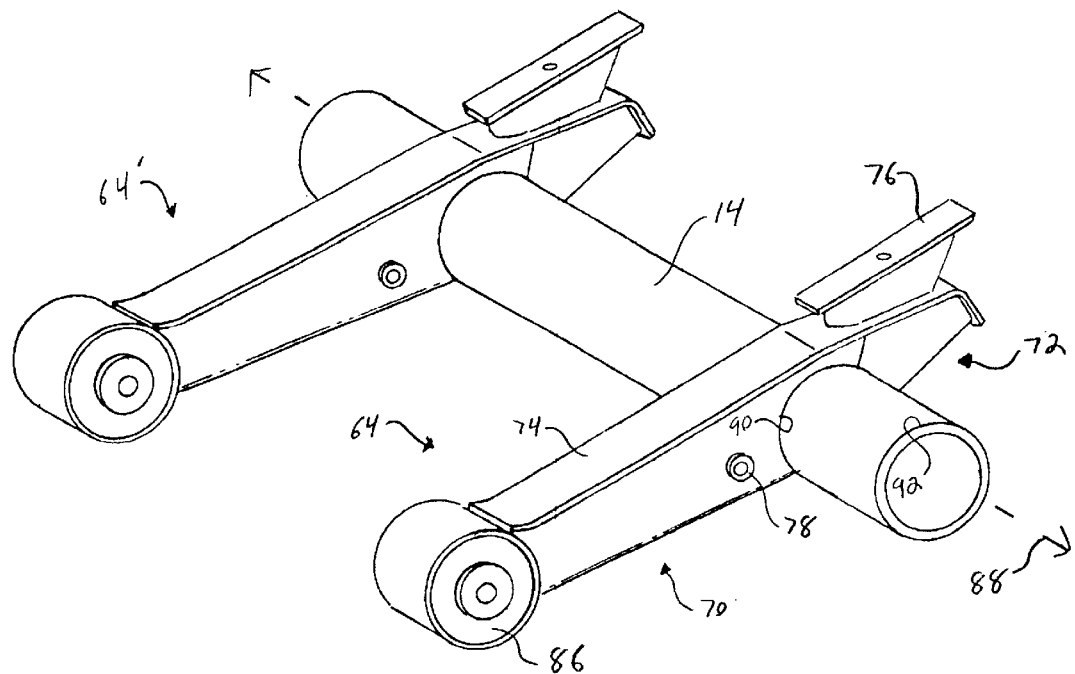
FIG. 3 is a perspective view of the control arms of FIG. 2.

Referring now to FIGS. 2 and 3, a control arm 64 for a vehicle suspension in accordance with the present invention will be described. FIGS. 2 and 3 disclose two similar control arms 64, 64' for use in two corresponding suspensions 22 disposed proximate either end of axle 14. Therefore, only one control arm 64 will be described in detail; it being understood that the control arms 64, 64' may be identical in structure and purpose. Control arm 64 may include members 70, 72, 74. Control arm 64 may also include a spring mounting bracket 76 and a tube 78.

Figure 5:
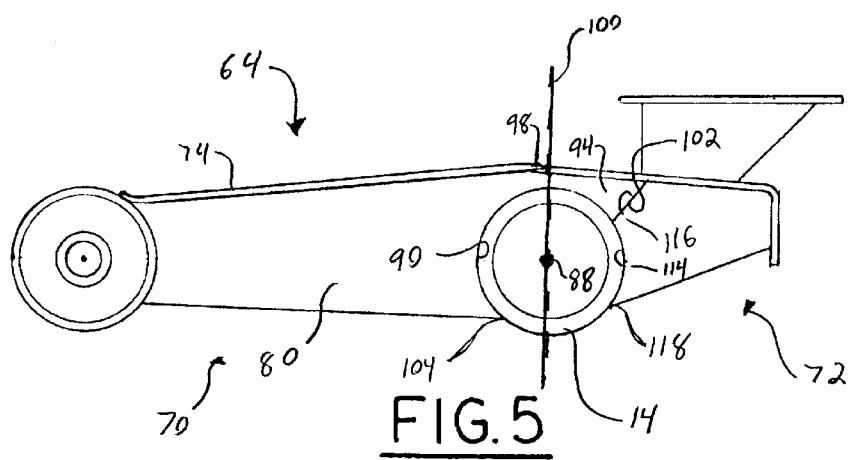
FIG. 5 is a side view of one of the control arms of FIG. 2.

Member 70, together with member 72, is provided to couple axle 14 to frame 12. Member 70 may be made from conventional metal and metal alloys such as steel and includes a pair of sidewalls 80, 82 and a lateral wall 84. Member 70 may also include a conventional bushing 86 disposed at one end of member 70 to enable member 70 to be pivotally mounted to bracket 28 (best shown in FIG. 1). Sidewalls 80, 82 extend generally vertically relative to earth ground. Sidewalls 80, 82 are axially spaced from one another and may include aligned holes configured to receive tube 78. Sidewalls 80, 82 define a recess 90 at one end that corresponds to a portion of an outer surface 92 of axle 14. In the illustrated embodiment, outer surface 92 is circular in shape and recess 90 is semi-circular shape, corresponding to an angular portion of surface 92. In particular recess 90 spans about one-hundred and eighty (180) angular degrees of surface 92. One end of recess 90 is marked by flanges 94, 96 extending from sidewalls 80, 82, respectively. Referring to FIG. 5, one end each of flanges 94, 96 forms an apex 98 in sidewalls 80, 82 in a plane 100 extending through the axial center of axle 14 and perpendicular to the longitudinal direction of vehicle 10. Flanges 94, 96 then extend downwardly (relative to earth ground) to define edges 102 that form an acute angle relative to plane 100 and to earth ground. Referring again to FIG. 2, lateral wall 84 extends between sidewalls 80, 82. Lateral 84 wall may be integral with sidewalls 80, 82 and member 70 of arm 64 may be formed from a single fabrication wherein sidewalls 80, 82 are formed by bending the fabrication to form a pair of bends 104, 106.

Member 72 also may be made from steel and also includes a pair of sidewalls 108, 110 and a lateral wall 112. Sidewalls 108, 110 extend generally vertically relative to earth ground. Sidewalls 108, 110 are axially spaced from one another and define a recess 114 at one end that corresponds to another portion of outer surface 92 of axle 14. In the illustrated embodiment, outer surface 92 is circular in shape and recess 114 is also partially circular corresponding to an angular portion of surface 92. In particular recess 114 spans about ninety (90) angular degrees of surface 92. One end of recess 114 is marked by edges 116 of sidewalls 108, 110. Edges 116 correspond to edges 102 on flanges 94, 96 of sidewalls 80, 82 of member 70. Referring to FIG. 5, therefore, edges 116 also form an acute angle relative to plane 100 and to earth ground. Edges 116 are welded or otherwise joined to edges 102 to couple member 72 to member 70. Referring again to FIG. 2, lateral wall 112 extends between sidewalls 108, 110. Lateral wall 112 may be integral with sidewalls 108, 110 and member 72 may be formed from a single fabrication wherein sidewalls 108, 110 are formed by bending the fabrication to form a pair of bends 118 (only one of which is visible in FIG. 2.

In accordance with one aspect of the present invention, lateral walls 84, 112 comprise bottom walls (relative to earth ground) of members 70, 72. The edges of recesses 90 and 114 (i.e., the edges 120, 122 and 124, 126 of sidewalls 80, 82 and 108, 110, in conjunction with the edges 128, 130 of lateral walls 84, 112 in the illustrated embodiment), abut outer surfaces 92 of axle 14 and form a continuous path for welding control arm 64 to axle 14. As a result, control arm 64 enables a stronger coupling to axle 14 than conventional control arms.

Referring to FIG. 5, in accordance with another aspect of the present invention, recesses 90, 114 of members 70, 72 together span more than one-hundred and eighty (180) angular degrees—and particularly two hundred and seventy (270) angular degrees in the illustrated embodiment—of surface 92 of axle 14. Despite this fact, arm 64 may be installed without sliding arm 64 onto axle 14. Accordingly, the inventive control arm 64 allows installation of other suspension, wheel, and brake components prior to installation of arm 64. It should be understood, however, that the angular distances spanned by recesses 90, 114—and the total angular distances spanned by recesses 90, 114—may vary from the distances shown in the illustrated embodiment.

Referring again to FIG. 2, member 74 closes off the open ends of members 70, 72. Member 74 may be made from conventional metals and metal alloy such as steel. Member 74 is welded or otherwise coupled to members 70, 72. Member 74 may be welded to member 70 prior to the coupling of members 70, 72 or may be welded to both of members 70, 72 after the coupling of members 70, 72.

Spring mounting bracket 76 provides a mounting point for spring assembly 66. Bracket 76 may be made from a variety of conventional metals and metal alloy such as steel. Bracket 76 is welded or otherwise coupled to member 74 of control arm 64. In the illustrated embodiment, bracket 76 includes a U-shaped riser 132 and a plate 134 mounted thereon. Riser 132 may be unitary in construction which, together with the shape and configuration of riser 132, enable a relatively strong mounting assembly for spring assembly 66. It should be understood, however, that the size, shape, and configuration of bracket 76 may vary responsive to design considerations associated with spring assembly 66.

Tube 78 is provided to mount shock absorber 68. Tube 78 may be made from steel or other conventional metal alloys and may be received within aligned slots (not shown) in sidewalls 80, 82 of member 70 of control arm 64. Referring to FIG. 1, tube 78 is sized to receive a fastener 136 such as a pin, bolt, or screw on which an eye 138 of shock absorber 68 may be mounted. The incorporation of tube 78 into control arm 64 is advantageous as compared to conventional vehicle suspensions because it provides a stronger mounting means for shock absorber 68 in comparison to the welded mounting brackets found in conventional vehicle suspensions. Further, because the holes in sidewalls 80, 82 are machined or punched, shock absorbers 68 are more accurately located as compared to conventional suspension systems in which the mounting bracket for the shock absorber 68 is welded to the control arm.

Spring assembly 66 is provided to dampen movement of frame 12 responsive to variations in the surface over which vehicle 10 is traveling. Spring assembly 66 is conventional in the art. In the illustrated embodiment, assembly comprises a conventional air spring incorporating a piston that reacts to air pressure within spring. The piston (not shown) is mounted to bracket 76 of control arm 64 in abutting relation with the spring. It should be understood by those in the art that a variety of known configurations for air or mechanical springs could be used without departing from the spirit of the present invention.

Figure 4:
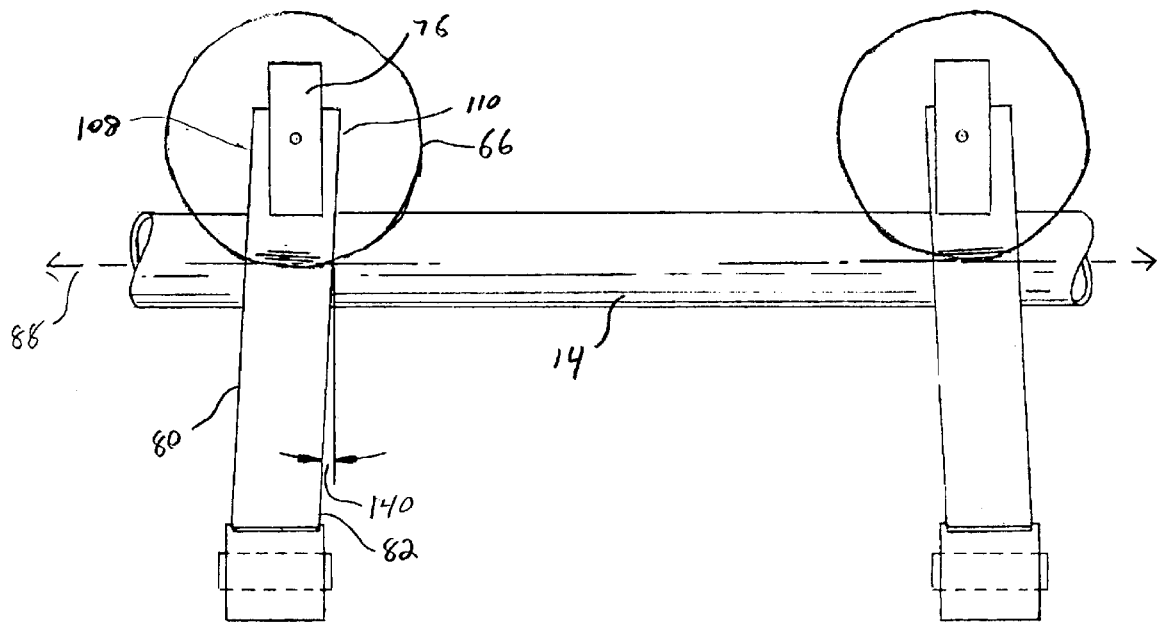
FIG. 4 is a top view of the control arms of FIG. 2.

Referring to FIG. 4, in accordance with another aspect of the present invention, sidewalls 80, 82 of member 70 and sidewalls 108, 110 of member 72 are angled in an inboard direction relative to axis 88 of axle 14 such that sidewalls 80, 82 and 108, 110 are further inboard proximate axle 14 than bracket 26 of frame 12. This orientation of sidewalls 80, 82 and 108, 110 generates a sufficient amount of clearance for mounting spring assembly 66 relative to wheels 18 and brake assembly 20 yet allows spring assembly 66, and the spring loads generated by spring assembly 66, to be centered on control arm 64. In particular, the center of spring assembly 66 may be disposed between sidewalls 108, 110 of member 72 and, preferably, may be equally spaced relative to sidewalls 108, 110. Further, because both sidewalls 80, 82 and 108, 110 are angled in an inboard direction, the width of lateral walls 84, 112 may be kept constant. As a result, the inventive control arm 64 uses less material and weighs less than conventional control arms. In one prototype embodiment, sidewalls 80, 82 and 108, 110 define an angle 140 of about 3.3 degrees relative to planes perpendicular to axis 88 of axle 14.

While the invention has been particularly shown and described with reference to the preferred embodiments thereof, it is well understood by those skilled in the art that various changes and modifications can be made in the invention without departing from the spirit and scope of the invention.

We claim:

1. A vehicle suspension control arm, comprising:
   a first member defining a first recess at one end, said first recess corresponding to a first portion of an outer surface of an axle; and,
   a second member coupled to said first member after said axle is received within said first recess, said second member defining a second recess corresponding to a second portion of said outer surface of said axle
   wherein each of said first and second members includes first and second spaced sidewalls and a lateral wall extending therebetween and edges of said sidewalls and said lateral walls of said first and second members define said first and second recesses and form a continuous weld path for joining said arm to said axle.

2. The suspension control arm of claim 1 wherein said lateral walls of said first and second members are integral with corresponding ones of said first and second sidewalls of said first and second members, respectively.

3. The suspension control arm of claim 1, further comprising:
   a third member coupled to said first and second members; and
   a spring mounting bracket disposed on said third member.

4. The suspension control arm of claim 3 wherein said spring mounting bracket comprises:
   a U-shaped riser having a unitary construction; and,
   a plate affixed to said riser.

5. The suspension control arm of claim 1 wherein said axle is circular in cross-section and said first and second recesses together span an angular portion of said axle greater than 180 degrees.

6. The suspension control arm of claim 5 wherein said angular portion is about 270 degrees.

7. A vehicle suspension for coupling an axle disposed about an axis to a vehicle frame, comprising;
   a control arm extending between said axle and a bracket of said vehicle frame, wherein said control arm includes first and second spaced sidewalls extending from a bushing disposed within said bracket, each of said first and second sidewalls angled along their entire length between said bushing and said axle in an inboard direction relative to said axis of said axle whereby said first and second sidewalls are further inboard proximate said axle than said bracket of said vehicle frame, and
   a spring mounted on said control arm wherein a center of said spring is disposed between said first and second sidewalls.

8. The suspension of claim 7 wherein said control aim includes a bottom wall extending between, and integral with, said first and second sidewalls.

9. A vehicle suspension for coupling an axle disposed about an axis to a vehicle frame, comprising:
   a control arm extending between said axle and a bracket of said vehicle frame
   wherein said control arm includes first and second spaced sidewalls, each of said first and second sidewalls angled in an inboard direction relative to said axis of said axle whereby said first and second sidewalls are further inboard proximate said axle than said bracket of said vehicle frame and said control arm includes first and second members, said first member defining a first recess at one end corresponding to a first portion of an outer surface of said axle, said second member defining a second recess corresponding to a second portion of said outer surface of said axle and said second member coupled to said first member after said axle is received within said first recess.

10. The suspension of claim 9, further comprising:
    a third member coupled to said first and second members; and
    a spring mounting bracket disposed on said third member.

11. The suspension of claim 9 wherein said axle is circular in cross-section and said first and second recesses together span an angular portion of said axle greater than 180 degrees.

12. A vehicle suspension for coupling an axle disposed about an axis to a vehicle frame, comprising:
    a control arm extending between said axle and a bracket of said vehicle frame, wherein said control arm includes first and second spaced sidewalls extending from a bushing disposed within said bracket, each of said first and second sidewalls angled along their entire length between said bushing and said axle in an inboard direction relative to said axis of said axle whereby said first and second sidewalls are further inboard proximate said axle than said bracket of said vehicle frame, said control arm including a tube extending therethrough;
    a shock absorber having an eye at one end; and,
    a fastener extending through said eye and said tube to thereby mount said shock absorber on said control arm.

13. A vehicle suspension for coupling an axle disposed about an axis to a vehicle frame, comprising:
    a control arm extending between said axle and a bracket of said vehicle frame, said control arm including
       first and second spaced sidewalls extending from a bushing disposed within said bracket to said axle and disposed about at least a portion of said axle, said first and second sidewalls including apertures therein; and,
       a tube disposed within said apertures in said first and second sidewalls;
    a shock absorber having an eye at one end; and,
    a fastener extending through said eye and said tube to thereby mount said shock absorber on said control arm.

14. The suspension of claim 13 wherein said first and second sidewalls are angled in an inboard direction relative to said axis of axle whereby said first and second sidewalls are further inboard proximate said axle than said bracket of said vehicle frame.

15. The suspension of claim 14, further comprising a spring mounted on said control arm wherein a center of said spring is disposed between said first and second sidewalls.

16. A vehicle suspension for coupling an axle disposed about an axis to a vehicle frame, comprising:
    a control arm extending between said axle and a bracket of said vehicle frame and disposed about at least a portion of said axle, said control arm including a tube extending therethrough;
    a shock absorber having an eye at one end; and,
    a fastener extending through said eye and said tube to thereby mount said shock absorber on said control arm
    wherein said control arm includes
       a first member defining a first recess at one end, said first recess corresponding to a first portion of an outer surface of said axle; and,
       a second member coupled to said first member after said axle is received within said first recess, said second member defining a second recess corresponding to a second portion of said outer surface of said axle.

17. The suspension of claim 16 wherein each of said first and second members includes first and second spaced sidewalls and a bottom wall extending between, and integral with, said first and second sidewalls.

18. The suspension of claim 16, further comprising:
    a third member coupled to said first and second members; and
    a spring mounting bracket disposed on said third member.

19. The suspension of claim 16 wherein said axle is circular in cross-section and said first and second recesses together span an angular portion of said axle greater than 180 degrees.

20. The suspension of claim 16 wherein edges of said first and second recesses form a continuous weld path for joining said arm to said axle.

* * * * *

UNITED STATES PATENT AND TRADEMARK OFFICE
CERTIFICATE OF CORRECTION

PATENT NO.     : 6,557,875 B2
DATED          : May 6, 2003
INVENTOR(S)    : Schlosser et al.

It is certified that error appears in the above-identified patent and that said Letters Patent is hereby corrected as shown below:

Delete title page and replace with the following title page.

United States Patent
Schlosser et al.

(10) Patent No.: US 6,557,875 B2
(45) Date of Patent: May 6, 2003

(54) VEHICLE SUSPENSION

(75) Inventors: Kraig Schlosser, Columbia City, IN (US); Martin Blessing, Fort Wayne, IN (US); Kent Davison, Columbia City, IN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/814,147

(22) Filed: Mar. 21, 2001

(65) Prior Publication Data

US 2002/0135151 A1 Sep. 26, 2002

(51) Int. Cl.$^7$ .................. B60G 7/00; B60G 3/12; B60B 37/00; B60B 35/00; B62G 3/18
(52) U.S. Cl. ..................... 280/124.153; 301/127; 280/124.128
(58) Field of Search ............ 280/124.128, 124.153; 301/127, 137

(56) References Cited

U.S. PATENT DOCUMENTS

| | | | |
|---|---|---|---|
| 4,293,145 A | * 10/1981 | Taylor | 267/34 |
| 4,415,179 A | * 11/1983 | Marinelli | 280/124.116 |
| 4,991,868 A | * 2/1991 | VanDenberg | 280/124.116 |
| 5,002,305 A | * 3/1991 | Raidel | 280/124.116 |
| 5,037,126 A | * 8/1991 | Gottschalk et al. | 280/124.116 |
| 5,203,585 A | * 4/1993 | Pierce | 280/124.116 |
| 5,366,237 A | 11/1994 | Dilling et al. | 280/711 |
| 5,375,871 A | * 12/1994 | Mitchell et al. | 280/124.116 |
| 5,403,031 A | * 4/1995 | Gottschalk et al. | 280/124.157 |
| 5,443,280 A | * 8/1995 | Kawaguchi et al. | 280/124.1 |
| 5,690,353 A | * 11/1997 | Vandenberg | 280/124.116 |
| 5,944,339 A | 8/1999 | McKenzie et al. | 280/678 |
| 5,954,351 A | 9/1999 | Koschinat | 280/124.116 |
| 5,988,672 A | * 11/1999 | VanDenberg | 280/124.11 |
| 6,039,336 A | * 3/2000 | Frey | 280/124.128 |
| 6,062,578 A | * 5/2000 | Richardson | 280/81.6 |
| 6,073,946 A | * 6/2000 | Richardson | 280/124.153 |
| 6,123,349 A | * 9/2000 | Depue | 280/124.106 |
| 6,241,266 B1 | * 6/2001 | Smith et al. | 280/124.116 |

FOREIGN PATENT DOCUMENTS

| | | | |
|---|---|---|---|
| JP | 09254623 A | * 9/1997 | B60B/13/08 |
| WO | WO9817487 A | * 6/1998 | B60G/9/00 |
| WO | WO00/01548 A | * 1/2000 | B60G/9/00 |

* cited by examiner

*Primary Examiner*—Paul N. Dickson
*Assistant Examiner*—Joselynn Y. Sliteris
(74) *Attorney, Agent, or Firm*—Dykema Gossett PLLC

(57) ABSTRACT

A vehicle suspension and a control arm therefor are provided. The control arm includes first and second members each defining a recess corresponding to a portion of the outer surface of a vehicle axle. The members are welded or otherwise coupled together to surround at least a majority of the axle thereby enabling installation of the control arm without sliding the arm onto the axle. Each of the members includes a pair of sidewalls and a lateral wall joining, and integral with, the sidewalls. The sidewalls are angled relative to an axis of the axle to provide sufficient clearance for a spring assembly mounted to the control arm and centering of spring loads. The two sidewalls of one member may further include aligned apertures configured to receive a tube on which a shock absorber may be mounted. The tube enables strong and accurate mounting of the shock absorber.

20 Claims, 3 Drawing Sheets

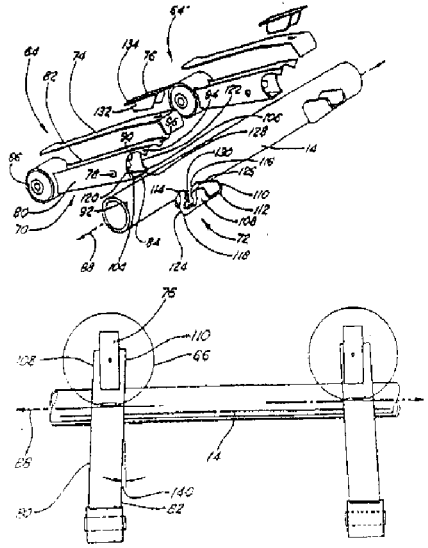

UNITED STATES PATENT AND TRADEMARK OFFICE
CERTIFICATE OF CORRECTION

PATENT NO. : 6,557,875 B2
DATED : May 6, 2003
INVENTOR(S) : Schlosser et al.

It is certified that error appears in the above-identified patent and that said Letters Patent is hereby corrected as shown below:

Drawings,
On sheet 1 of 3, replace the illustrated drawing with the following drawing.

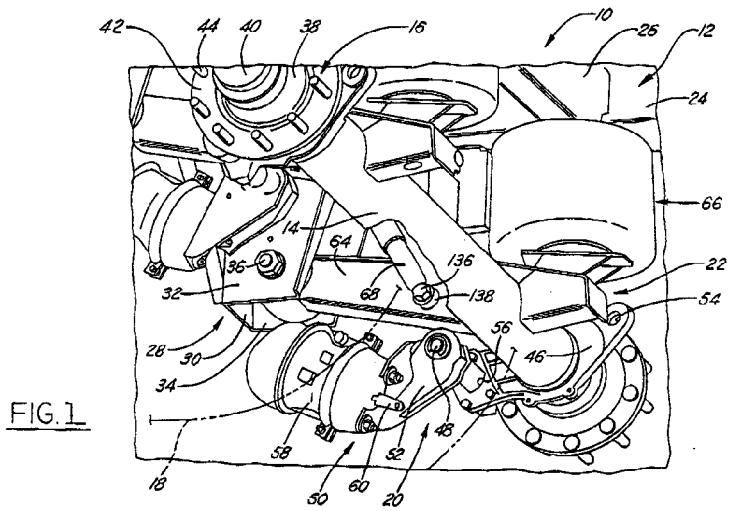

On sheet 2 of 3, replace the illustrated drawing with the following drawing.

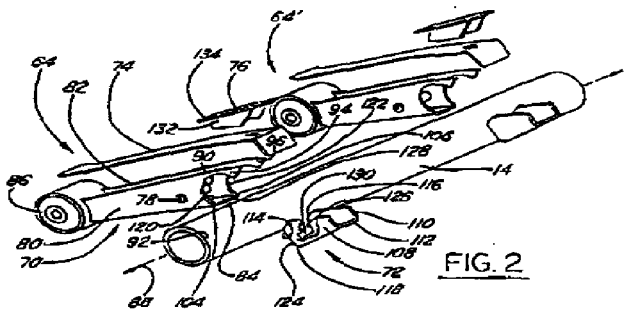

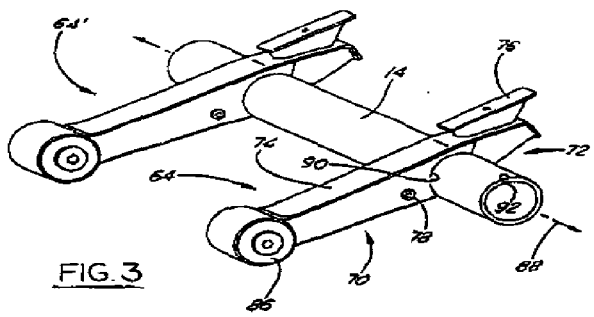

UNITED STATES PATENT AND TRADEMARK OFFICE
CERTIFICATE OF CORRECTION

PATENT NO.   : 6,557,875 B2
DATED        : May 6, 2003
INVENTOR(S)  : Schlosser et al.

It is certified that error appears in the above-identified patent and that said Letters Patent is hereby corrected as shown below:

Drawings (cont'd),
On sheet 3 of 3, replace the illustrated drawing with the following drawing.

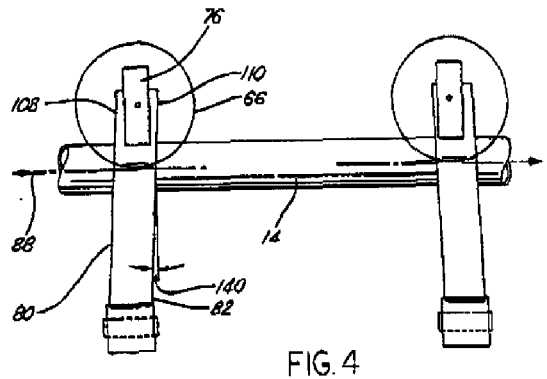
FIG. 4

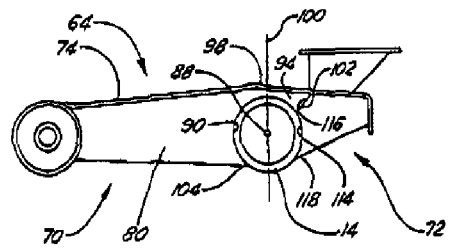
FIG. 5

Signed and Sealed this

Tenth Day of May, 2005

JON W. DUDAS
*Director of the United States Patent and Trademark Office*